United States Patent
Ullrich et al.

(10) Patent No.: US 7,953,583 B2
(45) Date of Patent: May 31, 2011

(54) METHOD FOR DETERMINING THE BEHAVIOR OF SHAFTS OF A MULTI-SHAFT MACHINE WHICH ARE JOINTLY MOVABLE TO MOVE A TOOL OR A TOOL RECEPTACLE

(75) Inventors: Joachim Ullrich, Stuttgart (DE); Weiliang Mi, Renningen (DE)

(73) Assignee: Siemens Aktiengesellschaft, München (DE)

( * ) Notice: Subject to any disclaimer, the term of this patent is extended or adjusted under 35 U.S.C. 154(b) by 588 days.

(21) Appl. No.: 12/064,126

(22) PCT Filed: Jul. 31, 2006

(86) PCT No.: PCT/EP2006/064849
§ 371 (c)(1),
(2), (4) Date: Feb. 19, 2008

(87) PCT Pub. No.: WO2007/020181
PCT Pub. Date: Feb. 22, 2007

(65) Prior Publication Data
US 2008/0306718 A1    Dec. 11, 2008

(30) Foreign Application Priority Data

Aug. 19, 2005  (DE) .......................... 10 2005 039 381
Apr. 5, 2006   (DE) .......................... 10 2006 015 981

(51) Int. Cl.
    *G06F 9/455*    (2006.01)
(52) U.S. Cl. ............................. 703/7; 409/143; 29/560
(58) Field of Classification Search .............. 703/7, 13, 703/6; 409/191, 143; 702/56; 700/170, 700/69, 193, 245; 29/560; 493/475; 73/432.1, 73/114.79; 187/406
See application file for complete search history.

(56) References Cited

U.S. PATENT DOCUMENTS

| | | | | |
|---|---|---|---|---|
| 3,584,534 A | * | 6/1971 | Hougen | 409/191 |
| 4,750,360 A | * | 6/1988 | Smith | 73/432.1 |
| 5,074,383 A | * | 12/1991 | Raikhlin et al. | 187/406 |
| 5,779,617 A | * | 7/1998 | Larkin et al. | 493/475 |
| 5,831,875 A | * | 11/1998 | Hirata et al. | 703/7 |
| 6,027,238 A | * | 2/2000 | Nagashima | 700/69 |
| 6,269,284 B1 | * | 7/2001 | Lau et al. | 700/193 |

(Continued)

FOREIGN PATENT DOCUMENTS

| | | |
|---|---|---|
| DE | 42 31 613 A1 | 3/1994 |
| EP | 0 610 204 A1 | 10/1992 |
| WO | WO 00/36367 A1 | 6/2000 |

*Primary Examiner* — Kandasamy Thangavelu
(74) *Attorney, Agent, or Firm* — Henry M. Feiereisen; Ursula B. Day

(57) ABSTRACT

Disclosed is a method for determining the behavior of jointly movable shafts of a multi-shaft machine. According to said method, a simulation model is created individually for each shaft. The shafts are then impinged upon individually by a movement pattern, and measurable variables are detected in order to be able to make a statement about the transformation of the movement pattern by the shaft. Especially the setpoint position and the actual position of the shafts are recorded (cf. figure). Simulation model parameters, e.g. the inert mass of the shaft, the friction or elasticity of the shaft, can be defined based upon an analysis of the detected measurable variables, whereupon a coordinated movement of at least two shafts can be simulated, the behavior of the individual shafts being considered independent from the behavior of the other shaft. A simulated trajectory is generated. A characteristic variable, e.g. the circularity deviation or the circular hysteresis, can be defined for the coordinated movement of the shafts.

12 Claims, 4 Drawing Sheets

U.S. PATENT DOCUMENTS

| | | | |
|---|---|---|---|
| H1998 H * | 11/2001 | Cameron et al. | 73/114.79 |
| 7,072,777 B1 * | 7/2006 | Wakui et al. | 702/56 |
| 2002/0143435 A1 * | 10/2002 | Terada et al. | 700/245 |
| 2003/0078762 A1 * | 4/2003 | Hashima et al. | 703/13 |
| 2005/0137739 A1 * | 6/2005 | Yoshida et al. | 700/170 |
| 2006/0242818 A1 * | 11/2006 | Penick et al. | 29/560 |

* cited by examiner

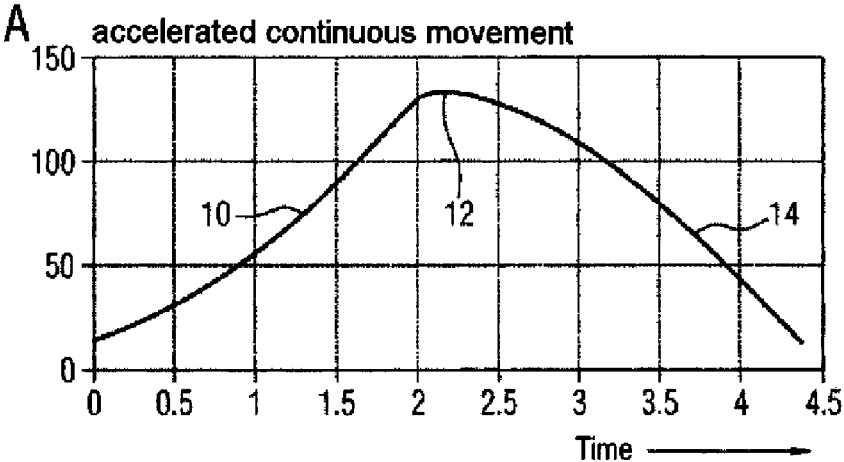
FIG 1A accelerated continuous movement
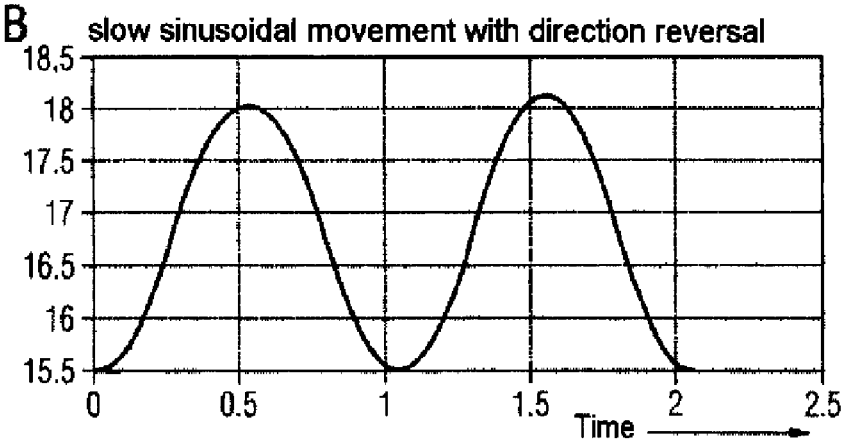
FIG 1B slow sinusoidal movement with direction reversal
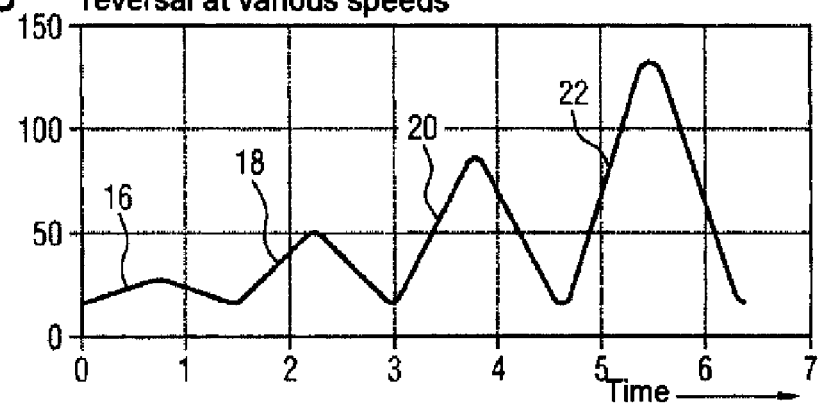
FIG 1C continuous movement with direction reversal at various speeds

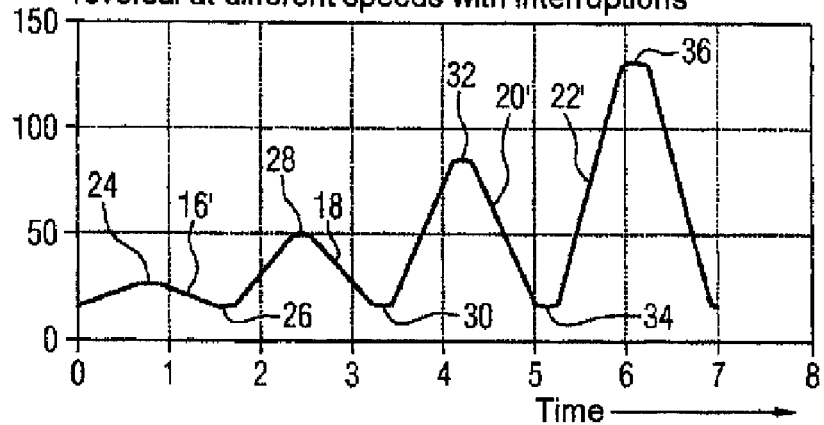
FIG 1D continuous movement with direction reversal at different speeds with interruptions
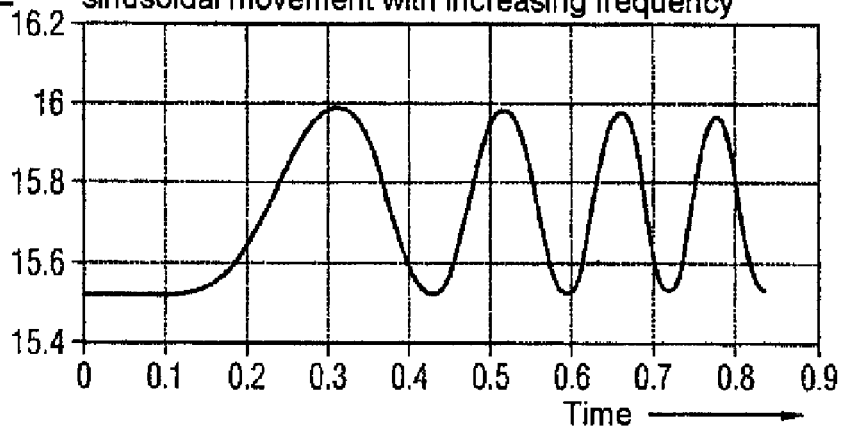
FIG 1E sinusoidal movement with increasing frequency
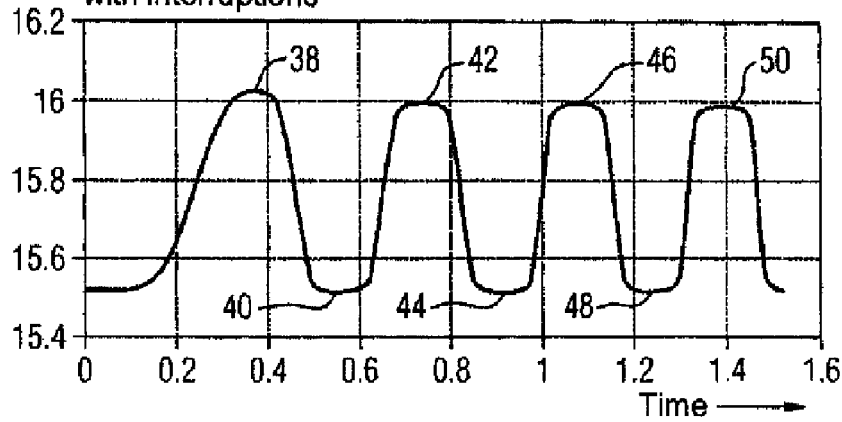
FIG 1F sinusoidal movement at increasing frequency with interruptions

METHOD FOR DETERMINING THE BEHAVIOR OF SHAFTS OF A MULTI-SHAFT MACHINE WHICH ARE JOINTLY MOVABLE TO MOVE A TOOL OR A TOOL RECEPTACLE

BACKGROUND OF THE INVENTION

The invention relates to a method for determining the behavior of shafts of a multi-shaft machine which are jointly movable to move a tool or a tool receptacle. For example, drilling or milling can be carried out with the aid of such a multi-shaft machine. The coordinated movements of the various machine shafts serve for moving a drill/milling cutter on a curve in space, in order thereby to generate specific contours on a workpiece.

It is known to characterize the behavior of the individual shafts individually. In addition to the individual behavior of the shafts, however, it is usually desirable to be able to have evidence of the interaction of the shafts. Specific tests have been developed for this purpose.

A test in very widespread use is what is known as the circularity test. In a circularity test, two shafts are moved in coordination with one another, so that the tool (its tip) or the tool receptacle ideally moves on a circular path contour. The deviation of the real path from this circularity is useful for analyzing the behavior of the two shafts. For this purpose, the positions during travel along the path are measured, special measuring instruments and evaluation programs being employed in the circularity test. A two-dimensional illustration of the path in comparison with a circle is thus obtained. Characterizing quantities, such as what is known as the circularity deviation and the circle reversal span, can be derived.

Other tests for determining the behavior of the jointly movable machine shafts have in common with the circularity test the fact that, in real terms, at least two selected machine shafts are moved, and that the tool or tool receptacle follows a path which is detected and is compared with a desired path. Paths of the most diverse possible kinds which are different from a circle are defined in this way.

It has been difficult to conduct previous tests because the shafts must, in real terms, execute a specific coordinated movement which has to be programmed specifically. It is not always possible that a specific machine actually generates the desired contour, such as, for example, the circular contour. Measuring the positions of the tool or of the tool receptacle is highly complicated.

SUMMARY OF THE INVENTION

The object of the invention is to provide a method for determining the behavior of jointly movable machine shafts of a multi-shaft machine, which method does not have the disadvantages described above.

The method according to the invention is based on the recognition that the coordinated movement of the shafts is a simple superposition of the individual movements of the shafts which basically do not influence one another. It is then sufficient to simulate the axial movement of the individual shafts and then to combine this into an overall simulation.

The method according to the invention includes the steps:
selection of at least two shafts, of which the coordinated movement with respect to one another is to be investigated,
preparation of a simulation model for each selected shaft with at least one parameter to be defined. (The simulation model basically uses a multiplicity of parameters. A "parameter to be defined" is such a parameter which, at the time of preparation of the simulation model, is not known, but can be determined on the basis of an analysis of the axial movement.)

The next step of the method according to the invention is:
action upon each selected shaft individually with at least one movement pattern and detection of at least one measurement variable for making it possible to have evidence on the implementation of the movement pattern by the shaft. The movement pattern reproduces the "desired movement" of the shaft and is reflected in corresponding control commands to a motor, with the aid of which the shaft is moved. Instead of the term "movement pattern", the term "speed profile" may also be used, because the distances to be covered are defined by the speed of the shaft. For this purpose, the motor delivers a specific torque in a directed manner or, in the case of a linear motor, a force is exerted on the shaft.

The method according to the invention is continued as follows:
definition of the parameters of the respective simulation model on the basis of an analysis of the measurement variables for each selected shaft, and
simulation of a coordinated movement of at least two selected shafts by the use of the associated simulation models, and
generation of a simulated path curve of the tool or of the tool receptacle and/or
definition of at least one characteristic quantity for the coordinated movement of the shafts.

In other words, according to the invention, one of the tests conducted in the prior art in real terms by means of a coordinated movement of the shafts is no longer conducted in real terms, but, instead, is simulated. A significant simplification, as compared with the prior art, is thereby afforded.

Thus, it is simple, by means of a superposed movement of two axial movements, to simulate a circular movement: for the simulation of a circle, it is merely necessary for a cosinusoidal movement to have a sinusoidal movement superposed on it perpendicularly thereto. By contrast, a corresponding concrete activation of the shafts requires a coordination of the sinusoidal movement of one shaft with the cosinusoidal movement of the other shaft, this involving complicated programming and, in real terms, not always being capable of being carried out.

The invention is employed particularly also when the coordinated movement is completely impossible on account of constraining conditions in reality. In other words, the simulated path curve then cannot be followed at all in reality. However, by an illustration of the simulation of these path curves or by the definition of a characteristic quantity on the basis of the simulation of the coordinated movements of the shafts, it then becomes possible to have fundamental evidence of the behavior of the jointly movable machine shafts, even when the conduct of a clearly defined test is not possible at all in reality.

In a preferred aspect of the invention, the measurement variables comprise the desired position of the shaft selected in each case, which is defined on the basis of the movement pattern, and the actual position of the shaft selected in each case. The latter may be determined by means of standard methods. What is used in this case is the direct measurement system, as it is known, a usually optical measurement system at the end of the mechanical transmission stage or the indirect measurement system which carries out measurements on the motor moving the shaft.

In addition to position measurement, the actual value of that quantity which is the cause of the movement of the shaft may also be measured. This is, as a rule, a torque which a motor delivers. In the case of a linear motor, the measurement variables should comprise a force generated by the linear motor.

The quality with which the parameter is defined stands and falls with how suitable the movement pattern is or the movement patterns are for providing corresponding evidence regarding the respective parameter. In a preferred aspect of the invention, for each parameter of the simulation model which is to be defined, a specific movement pattern with which the selected shaft is acted upon is selected or developed. In this case, therefore, the definition of the movement pattern takes place as a function of the parameter which is desired, that is to say is to be defined.

BRIEF DESCRIPTION OF THE DRAWING

Preferred embodiments of the invention are described below with reference to the drawing in which;

FIG. 1A to 1F illustrate difference movement patterns for use in the method according to the invention.

DETAILED DESCRIPTION OF PREFERRED EMBODIMENTS

Figure 2A:
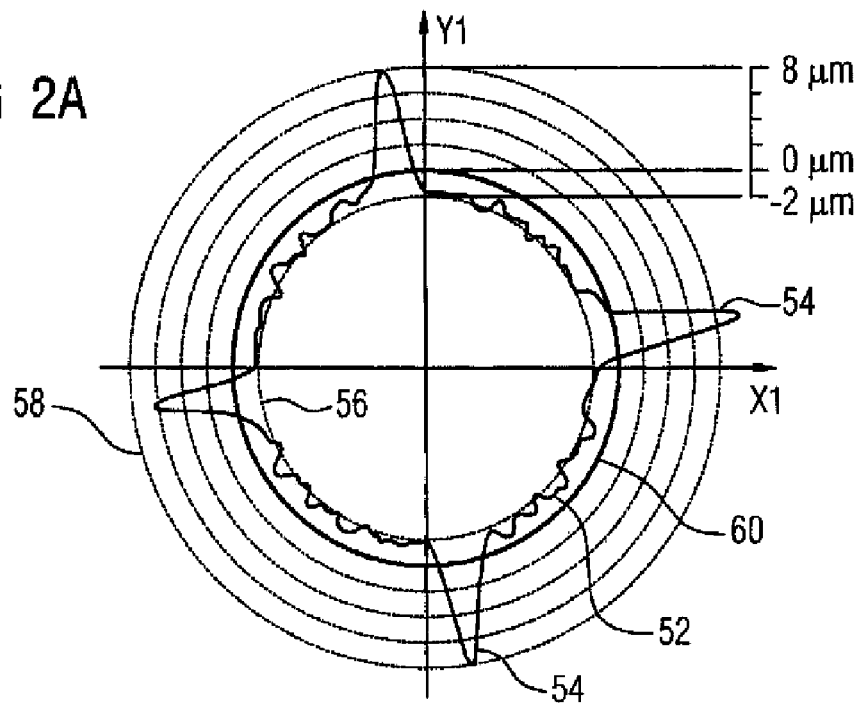
FIG. 2A illustrates the result of a conventional circularity test.

Evidence of two jointly movable machine shafts is to be provided. For this purpose, the machine shafts are treated as being independent of one another. A simulation model is provided for each shaft, parameters occurring in this first being carried out on the basis of measurement on the shaft. To measure the respective shaft, it is acted upon with predetermined movement patterns which are tailored to defining the respective parameters.

In a typical simulation model, the shaft is described as a mass which is moved. In advanced models, the shaft may also be modeled as two masses connected to one another by a spring, if the elasticity of the shaft plays a part in the movement. The various types of friction are of major importance. Different parameters may be defined for static friction and sliding friction.

For each movement pattern, the actual behavior of the shaft is measured, and also, preferably, the behavior of the motor controlling the shaft. The model usually also includes a modeling of a control of the shaft.

FIG. 1A shows a first movement pattern with which a shaft can be acted upon. It is an accelerated continuous movement in one direction and subsequently an accelerated continuous movement back. The position of a fixed point on the shaft is illustrated against time. The acceleration can be seen from the parabolic form of a segment 10 of the curve, and, after passing through a turning point 12, the returning segment 14 of the curve also has the form of a standing parabola, that is to say, here too, is again accelerated continuously. Movement patterns illustrated in FIG. 1A to 1F are desired curves for the position of a point on the shaft. By a derivation of the curves, a desired speed profile is obtained, and, from this, control values can be calculated for the respective motor moving the shaft.

The movement pattern from FIG. 1A serves for the exact definition of a parameter which is related to the inert mass of the shaft. The inert mass of the shaft can be determined from the actual behavior of the shaft. For this purpose, the actual value of the position of a point on the shaft is measured as a function of time and consequently of the imparted movement pattern. In a simulation of the control of the shaft behavior, the inclusion of the torque exerted by the motor or, in the case of a linear motor, of the force exerted by the motor may also be useful or even necessary.

A movement pattern illustrated in FIG. 1B represents slow sinusoidal movement with direction reversal. The movement is slow in order to rule out mechanical resonances in the system. The amplitude is low (cf. in particular, FIG. 1A), so that no loads from the shaft occur. With the aid of the movement pattern from FIG. 1B, the friction during direction reversal is to be detected, uninfluenced by other variables. That is to say, here too, the actual position of the shaft (or of a point on the shaft) is detected by measurement and is used for defining the friction parameter, in particular with regard to static friction.

FIG. 1C shows a movement pattern in which a continuous movement with direction reversal takes place, various speeds being used in succession in segments 16, 18, 20 and 22. By a continuous movement being measured at different speeds, it becomes possible to have evidence of the sliding friction.

According to a modification which is shown in FIG. 1D, there may be provision in each case, between the segments 16', 18', 20' and 22', for the movement to be interrupted briefly at the turning points 24, 26, 28, 30, 32, 34 and 36. In other words, in each case transience into the state of equilibrium takes place between the regions 16', 18', 20' and 22'. In particular, evidence of static friction, if appropriate also of the elasticity of the shafts, can be obtained from the behavior of the shaft during stopping from finite speed to zero and during starting from zero with rapid acceleration to finite speed.

A movement pattern illustrated in FIG. 1E is a sinusoidal movement in which the frequency of the sinusoidal movement is increased. As a result, in particular, any desired combinations of speed and acceleration are provided, and in this case the behavior of the shaft can be investigated, conclusions as to the mass of the shaft and as to friction becoming possible. The movement pattern from FIG. 1A may be modified by the movement pattern from FIG. 1F. Here, too, at the turning points 38, 40, 42, 44, 46, 48 and 50, in each case interruptions in the movement are provided, while, here too, as in the case of the movement pattern from FIG. 1D, the holding operation and the starting operation at the actual values determined in response to the movement pattern being of particular interest.

If, then, simulation models of at least two shafts have been prepared and, on the basis of reaction to action upon the respective shaft with corresponding movement patterns, the parameters of the simulation model have been defined, a coordinated movement of the shafts can be simulated. In this case, it is assumed that the determined behavior of the shafts is independent of the behavior of the other shaft in each case.

It thus becomes possible to simulate a circularity test. In a circularity test, the shafts are moved in coordination with one another in such a way that the tool held by one of the shafts follows essentially a circular path. The result of a typical circularity test is illustrated in FIG. 2A. A contour 52 which has a diameter of approximately 2.6 mm can be seen. The deviations from a circular form are illustrated on a greatly enlarged scale, see, in this respect, the scale at top right in the image. In the vicinity of the extent of the X-axes or on the Y-axes, the contour 52 comprises tips 54. These sharp deviations from the circular form arise due to the fact that a direction reversal of one of the shafts in each case has to be initiated at the corresponding points, faults occurring in the movement flow on account of the static friction.

FIG. 2A depicts a sequence of concentric circles, the inner circle 56 and the outer circle 58 being what are known as Chebyshev circles which envelop the actual path 52 such that the radial distance between them is a minimum. This minimum radial distance is designated as the circularity deviation. Only one path 52 is illustrated in the present case, and it is not specified whether the direction of rotation was clockwise or counterclockwise in this case. It is possible to record two paths in the manner of the path 52. These do not lie directly one above the other because of frictional effects. It is then possible to define what is known as the circle reversal span which is the greatest radial deviation between the actual paths of the two running directions. The reference point for radius calculation in this case is the center point of the corrector circle according to Gauss. Such a corrector circle is illustrated thickly in the FIG. 2A with continuous line and is designated by 60.

Figure 2B:
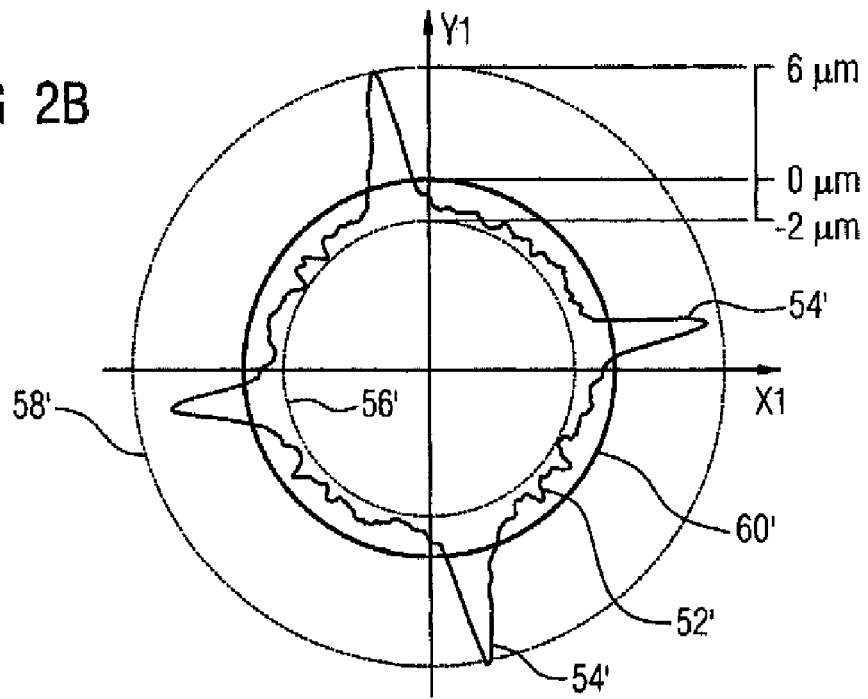
FIG. 2B illustrates the result of a simulated circularity test.

Since the circularity test is a standardized test, the circularity deviation and the circle reversal span are quantities which typically serve to characterize multi-shaft machines. FIG. 2B, then, shows that a circularity test does not necessarily have to be conducted in real terms. Instead, activation of the individual shafts takes place virtually such that the shafts would jointly move the tool along a circular path. On account of the parameterized simulation models obtained with the aid of the movement patterns from FIG. 1A to 1F, the real circular path can then be simulated, and a simulated circular path 52' is obtained. Here, too, Chebyshev circles 56' and 58' can be defined and the circularity deviation can thereby be determined. Here, too, a Gaussian circle 60' can be determined. Thus, according to the simulation, as a comparison between FIG. 2B and FIG. 2A makes clear, a circularity path 52' is obtained which closely resembles the real circularity path, including the tips 54 which also occur as tips 54' in the simulated curve 52'. To determine the behavior of the jointly movable machine shafts, therefore, on the one hand, a conventional image, as in the case of a circularity path, and, on the other hand, circularity deviation and circle reversal span as typical characteristic quantities are obtained.

The simulation of coordinated movements of two shafts is not restricted to the circularity test.

Paths other than circular paths are possible.

Figure 3:
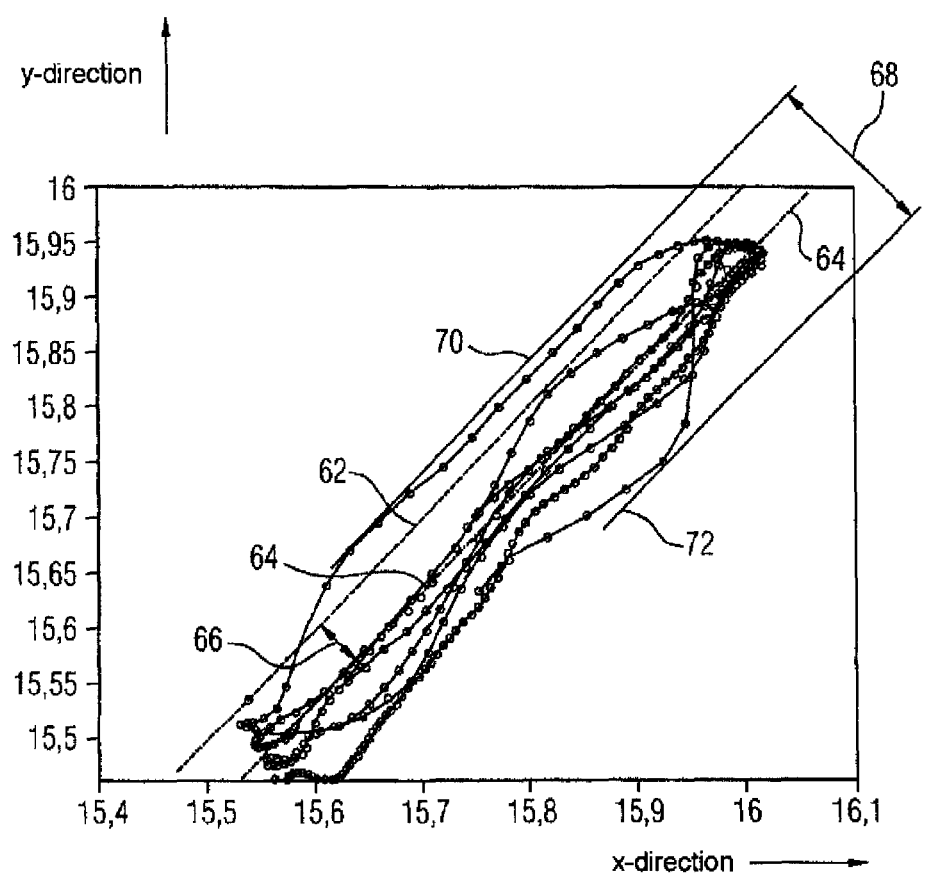
FIG. 3 illustrates the result of a test in which two shafts are acted upon with an identical movement pattern.

A particularly simple test is when two shafts perpendicular to one another are acted upon with the same movement pattern. If the two shafts were to have an identical behavior, the tool or tool receptacle on one of the shafts would move along an ideal diagonal. FIG. 3 shows the result of such a test in which both shafts were acted upon with the movement pattern from FIG. 1E, FIG. 3 illustrating, in particular, the end region of movement, including the location of direction reversal.

The diagram depicts the diagonal 62 which corresponds to the desired movement. With the exception of one path curve, all the path curves lie below this diagonal 62. This means that the movement in the X-direction goes somewhat further than in the Y-direction.

So that the behavior of the path can be compared with the diagonal 62, in the present case a regression straight line 64 is calculated which is depicted by dashes and dots. It is then possible directly to have a definition of a shift 66, that is to say of the distance from the diagonal 62 to the regression straight line 64 which, in the illustrated region, runs virtually parallel to the diagonal 62. The channel width 68 may be defined as an additional characteristic quantity. The channel width 68 is the distance between two straight lines 70 and 72 parallel to the diagonal 62 which include all the path curves.

Here, too, the simulation of the coordinated shaft movement may be used to define characteristic quantities, to be precise, in the present case, the shift and the channel width.

Simulation basically does not take second place to the conduct of a real test. On the one hand, path curves can be illustrated graphically, and, on the other hand, in each case at least one characteristic quantity can be defined from the path curves. As compared with the conduct of a real test, the complicated measurement of the positions is dispensed with. The information is obtained, without the shafts considered necessarily being programmable at all in a joint interpolation. Even information on the interaction of shafts which cannot be moved at all in any desired way with respect to one another due to constraining conditions (for example, gantry shafts) can be obtained. Even shafts of different machines can be compared with one another, conventional measurement methods ruling this out completely.

What is claimed is:

1. A method of performing circularity test for determining behavior of shafts of a multi-shaft machine moving a tool or a tool receptacle in a coordinated movement during a machining operation, wherein during the circularity test, the coordinated movement of the shafts causes the tool or the receptacle to ideally follow a circular path, comprising the steps of:

imparting at least one first movement pattern on the shafts of the machine, measuring at least one measurement variable of the imparted movement pattern on the shafts, applying the coordinated movement on the shafts of the machine corresponding to the circularity test and obtaining an actual circularity path curve of the tool or of the tool receptacle, determining a circularity deviation of the actual circularity path curve from an ideal circularity path curve, preparing a simulation model for each of the shafts, imparting at least one second movement pattern on the simulation model of shafts of the machine, computing at least one parameter of the simulation model for each shaft from simulation output and an analysis of the corresponding at least one measurement variable, applying the coordinated movement on the shafts of the simulation model corresponding to the circularity test, and generating a simulated circularity path curve of the tool or of the tool receptacle, determining a circularity deviation of the simulated circularity path curve from the ideal circularity path curve, presenting as the behavior of the shafts of the multi-shaft machine during the machining operation:

the actual circularity path curve of the tool or of the tool receptacle, the circularity deviation of the actual circularity path curve from an ideal circularity path curve, the simulated circularity path curve of the tool or of the tool receptacle, the circularity deviation of the simulated circularity path curve from the ideal circularity path curve, and the computed parameters for the simulation model of each shaft, and applying the difference between the circularity deviations of the simulated circularity path curve and the actual circularity path curve to simulations of shaft movements that cannot be made in actual machine, to estimate the shaft movements in the actual machine in those tests.

2. The method of claim 1, wherein the at least one measurement variable comprises an actual position of each one of the shafts based on the first movement pattern.

3. The method of claim 1, further comprising the step of moving a selected one of the shafts with a torque motor, with the measurement variable comprising an actual torque of the motor.

4. The method of claim 1, further comprising the step of moving a selected one of the shafts with a linear motor, with the measurement variable comprising a force generated by the linear motor.

5. The method of claim 1, wherein the second movement pattern imparted on the simulation model of a selected shaft is selected for each defined parameter of the simulation model.

6. The method of claim 1, further comprising the step of selecting the second imparted movement pattern from an acceleration pattern yielding as a parameter of the simulation model a mass of inertia of the multi-shaft machine moving a tool or a tool receptacle.

7. The method of claim 1, further comprising the step of selecting the second imparted movement pattern from a sinusoidal pattern having a frequency less than a resonance frequency of the multi-shaft machine moving a tool or a tool receptacle, yielding as a parameter of the simulation model a static friction.

8. The method of claim 1, further comprising the step of selecting the second imparted movement pattern from a continuous movement with substantially constant velocity and direction reversal, yielding as a parameter of the simulation model a dynamic friction.

9. The method of claim 8, further comprising the step of halting the movement at the direction reversal, yielding as parameters of the simulation model a static friction and an elasticity of the shafts.

10. The method of claim 1, further comprising the step of selecting the second imparted movement pattern from a sinusoidal pattern having an increasing frequency over time, yielding as parameters of the simulation model a static friction and a mass of inertia of the multi-shaft machine moving a tool or a tool receptacle.

11. The method of claim 10, further comprising the step of halting the movement at a direction reversal of the sinusoidal pattern, yielding as parameters of the simulation model a static friction and an elasticity of the shafts.

12. The method of claim 1, wherein in the simulation model of the shafts, the simulated circularity path curve of the toolor of the tool receptacle is generated with identical movement patterns for each shaft, with the movement pattern of a first shaft being orthogonal to a movement pattern of a second shaft.

* * * * *

UNITED STATES PATENT AND TRADEMARK OFFICE
CERTIFICATE OF CORRECTION

PATENT NO.       : 7,953,583 B2                                    Page 1 of 1
APPLICATION NO.  : 12/064126
DATED            : May 31, 2011
INVENTOR(S)      : Joachim Ullrich and Weiliang Mi It is certified that error appears in the above-identified patent and that said Letters Patent is hereby corrected as shown below:

Title Page, Item [56] References Cited, FOREIGN PATENT DOCUMENTS, replace:

"EP 0 610 204 A1" with --EP 0 510 204 A1--;

Column 8, claim 12, line 20: Replace "toolor" with the correct --tool or--.

Signed and Sealed this
Ninth Day of August, 2011

David J. Kappos
*Director of the United States Patent and Trademark Office*